2,913,432

Patented Nov. 17, 1959

2,913,432

METHOD OF DISPERSING PIGMENTS IN VINYL CHLORIDE RESINS AND COMPOSITIONS RESULTING THEREFROM

Rodwin E. Gulick, Pittsburgh, Pa., assignor to Union Carbide Corporation, a corporation of New York No Drawing. Application December 27, 1956
Serial No. 630,739

17 Claims. (Cl. 260—41)

This invention relates to a method for improving pigment dispersion in vinyl chloride resins.

The excellent protection afforded many varied substrates through the use of vinyl chloride resin-based surface coatings has been well known for many years. These coatings have extreme chemical inertness to the extent that their films are not appreciably attacked at normal temperatures by any concentration of alkalis or acids. In addition, they have a low water vapor permeability, excellent abrasion resistance, excellent durability to weathering, and are easy to apply by spraying, roller coating, dipping, tumbling or brushing. The gloss obtained with these vinyl chloride copolymer-based coatings hitherto has deterred their widespread use.

Vinyl chloride resins are non-polar in nature, and show poor attraction or wetting properties toward the commercially acceptable materials which are used for their pigmentation, such as titanium dioxide. Consequently, the methods available to disperse pigments in vinyl copolymer vehicles fairly satisfactorily have been expensive and specialized, thus further restricting their universal use in the paint industry. Up to now, the most satisfactory method has been through the use of the two roll mill, which is not normally a part of a paint manufacturer's equipment. As a result, the appliance finishes field and, in particular, the automotive finishes field have been almost entirely restricted to the use of other types of coatings because of the higher gloss and color retention obtainable at a lower cost.

Prior art attempts to improve the inherent poor pigment dispersion in vinyl chloride copolymer vehicles have resolved into two different approaches. First, through increased physical work on the pigment vehicle mixtures and, second, through the use of certain wetting agents.

The first approach is based on the realization that to properly incorporate pigments into films of vinyl chloride copolymer resins, the pigments must first be thoroughly dispersed in the resin or resin solution. In line with this requirement, pigment agglomerates must be split up into their ultimate particle size, and as completely wetted by the vehicle as possible. While this does not ordinarily involve any true grinding action, it nevertheless calls for the expenditure of a considerable amount of energy because of the extremely small size of the pigment particles, and the inherent toughness and relatively slight wetting action of the resin itself. The best results previously achieved with vinyl chloride copolymer systems were obtained when the pigment and resin were compounded together on a differential speed, two roll mill of the type used for rubber mixes. The hot rolls and the heat developed by the large shear stresses soften the resin and flux it into a plastic mass into which the pigment disperses readily. Internal mixers of the Banbury type also have given acceptable results in particular instances. Ball mills generally have yielded unsatisfactory results, except with certain lead pigments.

The second approach also has shown some merit in promoting pigment dispersions in vinyl chloride copolymer resins and resin solutions. The effects of these wetting agents on ultimate film properties, however, limit their use. Some have a deleterious effect on the film integrity or cause rapid discoloration or moisture failure. Compounds such as vegetable lecithin, lead soaps, and salts of sulfonated higher alcohols have been among the most promising wetting agents used with some success. Neither of these approaches has provided consistently satisfactory pigment dispersions.

With a view to overcoming the above-outlined disadvantages of prior art dispersion techniques, it is the general object of the instant invention to provide improved pigment dispersion in vinyl resin vehicles.

A further object of the invention is to provide vinyl resin coatings having improved gloss and hiding.

An additional object of the invention is to provide vinyl coatings having improved color retention without requiring additional stabilization of the baked finish.

A practical object of the invention is to provide a method of dispersing inorganic and synthetic organic pigments in vinyl resins, which method will not cause thermal breakdown of the vinyl resin.

The above and related objects and advantages of the present invention are realized by incorporating in typical pigment-vehicle mixtures certain metal organic dispersants selected from the group consisting of the carboxylates of silicon, tin and lead, and the aminoalcohols and polyhydric alcohol derivatives of silicon, tin, lead and zirconium. More specifically these dispersants are:

Metal carboxylates having the formula

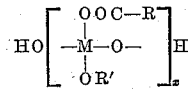

wherein M represents silicon, tin or lead; R is an aryl, alkaryl, aralkyl, alkyl or substituted alkyl group having from 10 to 18 carbon atoms; R' is an aryl, alkaryl, aralkyl, alkyl or substituted alkyl group having from 1 to 18 carbon atoms; and $x$ is a small integer, ranging between 1 and 3.

Metal aminoalcohol derivatives having the formulae

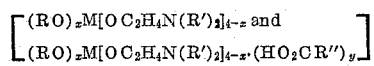

wherein M represents silicon, zirconium, tin or lead, R is an aryl, alkaryl, aralkyl, alkyl or substituted alkyl group having from 1 to 18 carbon atoms, R' is H, or aryl, alkaryl, aralkyl, alkyl or substituted alkyl group having from 1 to 4 carbon atoms, R" is an alkyl or a substituted alkyl group having from 10 to 18 carbon atoms, $x$ may be from 0 to 3, and $y$ equal to or less than $(4-x)$.

Metal polyhydric alcohol derivatives having the formula

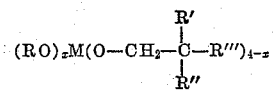

wherein M represents silicon, zirconium, tin or lead, R is an aryl, aralkyl, alkaryl or alkyl group having from 1 to 18 carbon atoms, R' is H, OH or an alkyl or substituted alkyl radical, R" is H or an alkyl or substituted alkyl, and R'" is a hydroxy alkyl or substituted hydroxy alkyl, and $x$ is a number from 1 to 3. Mixtures of the above may be used.

Representative compounds comprehended within the above definition included isopropoxy stearoxy polysilicate, isopropoxy stearoxy polystannate, isopropoxy 10-hydroxystearoxy polysilicate, isopropoxy benzoxy polysilicate, diethoxy-di-(triethanolamine)-silicate, dibutoxy-di-(triethanolamine)-silicate, diisopropoxy-di-(triethanolamine)-silicate, diethoxy-di-(β-diethylaminoethoxy)-silicate, diethoxy-di-(triethanolamine)-plumbate, diethoxy-di-(triethanolamine)-stannate, diethoxy-di-(triethanolamine)-silicate-N-oleate, dibutoxy-di-(β-diethylaminoethoxy)-silicate-N-oleate, diethoxy-di-(triethanolamine)-plumbate-N, N-di-oleate, tetra-(triethanolamine)-silicate, diethoxy-di-(triisopropanolamine)-silicate, diethoxy-di-(triisopropanolamine)-silicate-N-oleate, tetra-(2-ethylhexanediol-1,3)-silicate, isopropoxy-tri-(2-ethylhexanediol)-silicate, diisopropoxy-di-(2-ethylhexanediol-1,3)-silicate, diisopropoxy-di-(2-ethylhexanediol-1,3)-stannate, di-(triethoxysiloxy)-glyceryl oleate, tri-(triethoxysiloxy)-pentaerythrityl oleate, diethyl-di-(triethanolamine)-zirconate-N, N-distearate.

These compounds are disclosed and claimed together with method of preparation thereof, in the co-pending applications of H. Lamprey and J. O. Koehler, Serial No. 578,782, filed April 17, 1956, and Serial No. 629,797, filed December 21, 1956.

The method disclosed herein has given improved pigment dispersions in vinyl resin vehicles over all prior methods described, and allows the use of the more universally acceptable, less expensive grinding equipment, the pebble mill, with greatly decreased grinding times and higher pigment concentrations.

It has been found that this improved method of pigment dispersion provides vinyl coatings with improved gloss and hiding through better dispersion. In addition, color retention without additional stabilization in the baked vinyl finishes is improved. These results are in direct contrast to prior methods which gave lower gloss and poorer color retention because of thermal breakdown of the vinyl resin because of prolonged grinding.

In more detail the types of vinyl chloride resins to which the method and compounds of the invention are applicable include hydrolyzed vinyl chloride copolymers, and copolymers of vinyl chloride with other polymerizable ethylenically unsaturated monomers such as vinyl acetate, vinyl propionate, ethyl acrylate, dibutyl malleate, diethyl fumarate, vinylidene chloride, vinyl fluoride and ethylene. Usually the vinyl chloride predominates in such copolymers to the extent of 60 percent or more thereof. Of particular importance are conjoint polymers of vinylidene chloride with vinyl chloride containing from 70 percent to 98 percent vinyl chloride and from 2 percent to 30 percent of another polymerizable compound. Copolymers of vinyl chloride with vinyl acetate containing from 60 percent to 99 percent of vinyl chloride are among the most widely used vinyl chloride resins, and the compounds of the invention are of particular value therewith.

The compounds of the invention may be dispersed in the resins by any suitable expedient, as long as a uniform distribution is obtained.

In the preferred embodiment of the invention, the pigment or pigment combination to be dispersed is charged to a pebble or ball mill in its usual dry commercial form, by a convenient method. The mill should be previously charged with the preferable grinding medium, borundum cylinders or flint pebbles. The pigment concentration charged is dependent upon the type of pigment used. It varies from 10 percent to 75 percent of the ultimate paste composition. In the case of titanium dioxide, the maximum pigment concentration preferred is 55 percent to 62 percent. The second ingredient to be charged to the mill is the solvent mixture. The preferred solvent mixture consists of one part by weight of a ketone solvent, such as methyl ethyl ketone or methyl isobutyl ketone (MIBK), and one part of an aromatic diluent such as toluene.

Plasticizers employed in this invention may be any of the typical esters used with vinyl chloride resins, such as those disclosed by M. C. Reed, Industrial and Engineering Chemitsry, vol. 35, page 896.

The plasticizer, the vinyl chloride copolymer resin, and the metal organic dispersant are then added separately in any order to the mill. The preferred vinyl resin and plasticizer combined concentration is 10 percent to 30 percent by weight based on the pigment. Equal parts of plasticizer and dry vinyl chloride copolymer resin are preferred. The preferred plasticizers are the monomeric phthalates or phosphates such as di(2-ethyl hexyl) phthalate or tricresyl phosphate. The vinyl chloride copolymer resins preferred are the type having vinyl low fatty acid esters, or esters of unsaturated acids copolymerized with the vinyl chloride.

The preferred concentration of organometallic metallic additive is 1.0 percent to 2.0 percent by weight of the pigment. However, good results are obtained with additive concentrations from as low as 0.5 percent to as high as 5.0 percent by weight of the pigment.

After milling for 16 to 24 hours, the pigment dispersion is incorporated in a typical vinyl copolymer type coating by the normal procedure of addition of vehicle to the pigment paste under continuous agitation. As an example such a coating has an ultimate composition in parts by weight of 17.3 vinyl chloride copolymer, 2.8 plasticizer di(2-ethyl hexyl phthalate), 14.4 titanium dioxide, and 65.5 thinner mixture (MIBK and toluene equal parts).

The following are examples illustrative of the invention in which parts are parts by weight.

EXAMPLE I

The pebble mill paste was prepared as follows by direct charge to the mill:

| | Parts |
|---|---|
| Titanium dioxide | 60.0 |
| Methyl isobutyl ketone | 13.7 |
| Toluene | 13.7 |
| Di-(2-ethyl hexyl) phthalate | 6.0 |
| Vinyl chloride copolymer resin | 6.0 |
| Dibutoxy-di (triethanolamine) silicate N,N dioleate | 0.6 |
| | 100.0 |

The mixture was milled for 16 hours, and the following vinyl lacquer was prepared from paste or pigment dispersion.

| | Parts |
|---|---|
| Pebble mill paste | 24.0 |
| Added with vigorous agitation: Vinyl chloride copolymer resin solution (20% resin in 1/1 MIBK/toluene) | 80.0 |
| Di (2 ethyl hexyl) phthalate | 1.0 |
| | 105.0 |

This coating was thinned with a ketone-toluene solvent mixture and applied on unprimed bonderized steel, and on primed cold rolled steel by spraying. A 1.5 to 2.0 mil film (dry) was applied and baked for 30 minutes at 280° F. The gloss and color retention were compared with the same coating prepared from two roll mill and other pebble mill pigment dispersions. The coating so produced has improved gloss and baked color retention over coatings prepared by other dispersion methods. Its gloss was determined with a Gardner 60° glossmeter. 60° gloss was equal to or better than that obtained with the coating made from the two roll pigment dispersion and color and hiding were superior.

Using the same operations as in Example I, the following compositions were prepared:

EXAMPLE II

Pebble mill paste:

| | Parts |
|---|---|
| Titanium dioxide | 60.0 |
| Methyl isobutyl ketone | 13.4 |
| Toluene | 13.4 |
| Di (2 ethyl hexyl phthalate) | 6.0 |
| Vinyl chloride copolymer resin | 6.0 |
| Diethoxy-di (triethanolamine) silicate monooleate | 1.2 |
| | 100.0 |

Vinyl lacquer coatings prepared from the above paste and applied over both bonderized steel and cold rolled steel, the same as in Example I, gave excellent gloss, color retention and hiding.

EXAMPLE III

Pebble mill paste:

| | Parts |
|---|---|
| Titanium dioxide | 60.0 |
| Methyl isobutyl ketone | 13.5 |
| Toluene | 13.5 |
| Di(2 ethyl hexyl phthalate) | 6.0 |
| Vinyl chloride copolymer resin | 6.0 |
| Butoxy stearoxy polysilicate | 1.0 |
| | 100.0 |

Vinyl lacquer coatings prepared from the above paste as in Example I and applied over both bonderized and cold rolled steel, gave good hiding and color retention, but not as high a gloss as obtained with Examples I, II and III, even though high pigmentation was obtained in the paste formulation.

EXAMPLE IV

Pebble mill paste:

| | Parts |
|---|---|
| Titanium dioxide | 60.0 |
| Methyl isobutyl ketone | 13.7 |
| Toluene | 13.7 |
| Di(2 ethyl hexyl phthalate) | 6.0 |
| Hydrolyzed vinyl chloride copolymer resin | 6.0 |
| Diethoxy di-(triethanolamine) silicate-N,N dioleate | 0.6 |
| | 100.0 |

The following vinyl lacquer was prepared from the above pigment dispersion.

| | Parts |
|---|---|
| Pebble mill paste | 24.0 |
| Added with vigorous agitation: Hydrolyzed vinyl chloride copolymer resin solution (20% resin in 1/1 MIBK/toluene) | 80.0 |
| Di (2 ethyl hexyl) phthalate | 1.0 |
| | 105.0 |

The coating applied over both bonderized steel and cold rolled steel, as in Example I, gave excellent gloss, color retention and hiding.

EXAMPLE V

| | Parts |
|---|---|
| Titanium dioxide | 54.0 |
| Antimony oxide, Timonox | 6.0 |
| Methyl isobutyl ketone | 13.4 |
| Toluene | 13.4 |
| Di(2 ethyl hexyl phthalate) | 6.0 |
| Vinyl chloride copolymer resin | 6.0 |
| Diethoxy-di(TEA)-silicate-N,N dioleate | 1.2 |
| | 100.0 |

In the following examples, parts are by weight. The pebble mill pastes were prepared as follows by direct charge to the mill.

| | 6 | 7 | 8 |
|---|---|---|---|
| Phthalocyanine Blue | 25.0 | | |
| Synthetic Organic Red | | 32.0 | |
| Synthetic Iron Oxide | | | 55.0 |
| Hydrolyzed Vinyl Chloride Copolymer | 4.2 | 4.6 | 5.5 |
| Di-2 Ethyl Hexyl Phthalate | 4.2 | 4.6 | 5.5 |
| Dibutoxy-Di (Triethanolamine) Silicate N,N Dioleate | 0.8 | 0.9 | 1.1 |
| Methyl Isobutyl Ketone | 32.9 | 28.9 | 16.5 |
| Toluene | 32.9 | 29.0 | 16.4 |
| | 100.0 | 100.0 | 100.0 |

The mixtures were milled for 24 hours and the following vinyl lacquers were prepared from the pigment dispersion.

| | 6 | 7 | 8 |
|---|---|---|---|
| Pebble Mill Paste 6 | 30.8 | | |
| Pebble Mill Paste 7 | | 29.5 | |
| Pebble Mill Paste 8 | | | 28.4 |
| 20 Percent Solution of Bakelite Resin VYHH (in 1/1 MIBK/Toluene Mixture) | 68.0 | 69.4 | 70.0 |
| Di-2 Ethyl Hexyl Phthalate | 1.2 | 1.1 | 1.6 |
| | 100.0 | 100.0 | 100.0 |

These coatings were thinned with a ketone-toluene solvent mixture and applied on unprimed bonderized steel and primed cold rolled steel by spraying. Approximately a 2.0 mil film was applied. The coatings were baked for 30 minutes at 280° F.

The resulting 60° gloss represented an improvement over other similar pebble mill pigment dispersions which do not contain the additives of this invention.

The data of Examples 6 and 7 above shows that the method of the invention is applicable also to commercial organic pigments.

The method of the invention has given excellent results also with antimony oxide and carbon black pigments. The addition of the compounds of the invention to vinyl chloride pebble mill pastes substantially increases paste fluidity and permits decreased grinding time with improved pigment dispersion and gloss. The addition of the compounds of the invention to the paste also promotes better color retention in the ultimate vinyl finish without additional stabilization. This feature is very important, for it eliminates a common fault of white vinyl chloride coatings, poor initial whiteness, as compared to the usual appliance finishes. Thus coatings made with the compounds of the invention showed no discoloration after 1200 hour exposure to ultraviolet light. During the same exposure, control finishes made from a pebble mill pigment dispersion without additive became yellow and decreased in gloss.

Comparing coatings conforming to the composition of Example I above, it will be seen from the table below that whiteness of the order obtained with standard commercial alkyd-type appliance finish may be gotten with vinyl chloride resin coatings containing the additives of the invention.

*Initial whiteness ratings obtained with photovolt reflectometer model 610 tri-green filter Std. 76.5*

METHOD OF PIGMENT DISPERSION

| Vinyl Pebble Mill No Stabilizer | Vinyl Pebble Mill With Stabilizer | Vinyl Two Roll Mill | Std. Alkyd Appliance Finish |
|---|---|---|---|
| 78.5 | 89.5 | 79.0 | 87.0 |

It should be noted from the foregoing data that the additives of the invention function conjointly as resin stabilizers, and as pigment dispersants. The importance of their so functioning can be appreciated best by bearing in mind that vinyl chloride resins are particularly sensitive to the effect of heat. The effect of heat on the normally colorless transparency of these resins is to darken and opacify them, the color change manifested by a transition through shades of yellow, deepening to amber and brown, and in extreme cases to black. In addition, vinyl chloride resins are discolored by exposure to sunlight or artificial light, of which a substantial amount is in the ultra-violet region. In the prior art, the expedient of employing both a known heat stabilizer and a known light stabilizer in a vinyl chloride resin has not always been practical because of interfering effects by one stabilizer on the other, resulting in either poorer heat or color stability than would normally be obtained in the absence of the second stabilizer. Furthermore, a mixture of stabilizers can destroy the normal transparency of vinyl chloride resins if these are incompatible with each other or with the resins. All these problems are obviated by the practice of the instant invention, for the compounds thereof provide both heat and light stability as well as improve the dispersion characteristics of pigments used in vinyl chloride coating compositions.

What is claimed is:

1. A coating composition having improved gloss and baked color retention, comprising a mixture of a vinyl chloride resin selected from the group consisting of vinyl chloride homopolymers and copolymers of vinyl chloride and another ethylenically unsaturated monomer which are predominantly composed of vinyl chloride polymerized therein, a solvent for said resin, a pigment, a plasticizer and between .5 percent and 5.0 percent by weight of said pigment of at least one organo-metallic additive selected from the group consisting of metal carboxylates having the formula

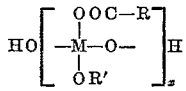

wherein M is selected from the group consisting of silicon, tin and lead, R is a radical selected from the group consisting of aryl, alkaryl, aralkyl, alkyl and substituted alkyl radicals having from 10 to 18 carbon atoms, R' is a radical selected from the group consisting of aryl, alkaryl, aralkyl, alkyl and substituted alkyl radicals having from 1 to 18 carbon atoms, $x$ being a small integer ranging between 1 and 3; metal aminoalcohol derivatives having the formulae

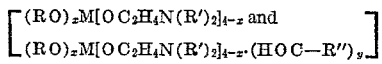

where M is selected from the class consisting of silicon, tin, zirconium and lead, R is a radical selected from the group consisting of aryl, alkaryl, aralkyl, alkyl and substituted alkyl radicals having from 1 to 18 carbon atoms, R' is a radical selected from the group consisting of aryl, alkaryl, aralkyl, alkyl and substituted alkyl groups having from 1 to 18 carbon atoms, R'' is a radical selected from the group consisting of aryl, alkaryl, aralkyl, alkyl and substituted alkyl radicals having from 10 to 18 carbon atoms, $x$ is a number from 0 to 3, and $y$ is a number whose maximum value equals $(4-x)$, and metal polyhydric alcohol derivatives having the formula

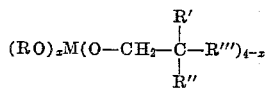

where M is selected from the group consisting of silicon, zirconium, tin and lead, R is a radical selected from the group consisting of aryl, alkaryl, aralkyl, alkyl and substituted alkyl groups having from 1 to 18 carbon atoms, R' is a radical selected from the group consisting of hydrogen, hydroxyl, alkyl or substituted alkyl, R'' is selected from the group consisting of hydrogen, alkyl or substituted alkyl radicals, and R''' is selected from the group consisting of hydroxy alkyl and substituted hydroxy alkyl radicals; $x$ is a number from 1 to 3; and mixtures thereof in said media.

2. The composition of claim 1 wherein said additive is dibutoxy-di(triethanolamine) silicate-N,N dioleate.

3. The composition of claim 1 wherein said additive is diethoxy-di(triethanolamine) silicate monooleate.

4. The composition of claim 1 wherein said additive is butoxy stearoxy polysilicate.

5. The composition of claim 1 wherein said additive is diethoxy-di(triethanolamine) silicate-N,N dioleate.

6. The composition of claim 1 wherein the amount of additive present ranges from 1 percent to 2 percent by weight of said pigment.

7. The composition of claim 1 wherein said pigment is a synthetic organic pigment.

8. The composition of claim 1 wherein said resin is a conjoint polymer containing from 70 percent to 98 percent of vinyl chloride with vinylidene chloride, and from 2 percent to 30 percent of vinylidene chloride.

9. The composition of claim 1 wherein said resin is a copolymer of vinyl chloride with vinyl acetate containing from 60 percent to 99 percent of vinyl chloride.

10. In a process for producing a coating composition by dispersing pigment in a plasticizer and a vinyl chloride resin selected from the group consisting of vinyl chloride homopolymers and copolymers of vinyl chloride and another ethylenically unsaturated monomer which are predominantly composed of vinyl chloride polymerized therein, and a solvent for said resin, the improvement which consists in incorporating with said composition from between 0.5 percent to 3.5 percent by weight of said pigment of at least one organo-metallic additive selected from the group consisting of metal carboxylates having the formula

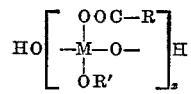

wherein M is selected from the group consisting of silicon, tin and lead, R is a radical selected from the group consisting of aryl, alkaryl, aralkyl, alkyl and substituted alkyl radicals having from 10 to 18 carbon atoms, R' is a radical selected from the group consisting of aryl, alkaryl, aralkyl, alkyl and substituted alkyl radicals having from 1 to 18 carbon atoms, $x$ being a small integer ranging between 1 and 3; metal aminoalcohol derivatives having the formulae

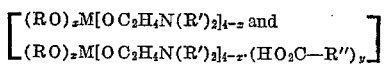

where M is selected from the class consisting of silicon, tin, zirconium and lead, R is a radical selected from the group consisting of aryl, alkaryl, aralkyl, alkyl and substituted alkyl radicals having from 1 to 18 carbon atoms, R' is a radical selected from the group consisting of aryl, alkaryl, aralkyl, alkyl and substituted alkyl groups having from 1 to 18 carbon atoms, R'' is a radical selected from the group consisting of aryl, alkaryl, aralkyl, alkyl and substituted alkyl radicals having from 10 to 18 carbon atoms, $x$ is a number from 0 to 3, and $y$ is a number whose maximum value equals $(4-x)$, and metal polyhydric alcohol derivatives having the formula

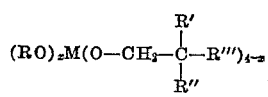

where M is selected from the group consisting of silicon, zirconium, tin and lead, R is a radical selected from the group consisting of aryl, alkaryl, aralkyl, alkyl and substituted alkyl groups having from 1 to 18 carbon atoms, R' is a radical selected from the group consisting of hydrogen, hydroxyl, alkyl or substituted alkyl, R'' is selected from the group consisting of hydrogen, alkyl or substituted alkyl radicals, and R''' is selected from the group consisting of hydroxy alkyl and substituted hydroxy alkyl radicals, $x$ is a number from 1 to 3; and mixtures thereof in said media.

11. The process of claim 10 wherein the amount of said organometallic derivative used ranges from 1 percent to 2 percent by weight of said pigment.

12. The process of claim 10 wherein the vinyl chloride resin is a conjoint polymer of vinyl chloride with vinylidene chloride containing from 70 percent to 98 percent of vinyl chloride and from 2 percent to 30 percent of vinylidene chloride.

13. The process of claim 10 wherein said resin is a copolymer of vinyl chloride with vinyl acetate containing from 60 percent to 99 percent of vinyl chloride.

14. The process of claim 10 wherein said additive is dibutoxy-di-(triethanolamine) silicate-N, N-dioleate.

15. The process of claim 10 wherein said additive is diethoxy-di-(triethanolamine) silicate monooleate.

16. The process of claim 10 wherein said additive is butoxy stearoxy polysilicate.

17. The process of claim 10 wherein said additive is diethoxy di-(triethanolamine) silicate-N, N-dioleate.

References Cited in the file of this patent
UNITED STATES PATENTS

| | | |
|---|---|---|
| 2,490,691 | Langkammerer | Dec. 6, 1949 |
| 2,584,351 | Hunter et al. | Feb. 5, 1952 |
| 2,634,285 | Rust et al. | Apr. 7, 1953 |